United States Patent [19]
Bowen et al.

[11] Patent Number: 5,508,131
[45] Date of Patent: Apr. 16, 1996

[54] INJECTION MOLDED BATTERY CONTAINMENT FOR BIPOLAR BATTERIES

[75] Inventors: Gerald K. Bowen, Cedarburg; Michael G. Andrew, Wauwatosa; John P. Dinkelman, South Milwaukee, all of Wis.

[73] Assignee: Globe-Union Inc., Milwaukee, Wis.

[21] Appl. No.: 224,033

[22] Filed: Apr. 7, 1994

[51] Int. Cl.[6] ................................................ H01M 10/18
[52] U.S. Cl. ...................... 429/210; 429/178; 429/241; 429/245; 429/247
[58] Field of Search ...................... 29/623.2, 2; 429/210, 429/241, 245, 247, 99, 100, 97, 131, 178, 144, 154, 234, 163

[56] References Cited

U.S. PATENT DOCUMENTS

| | | |
|---|---|---|
| 4,275,130 | 6/1981 | Rippel et al. ........................... 429/144 |
| 4,900,643 | 2/1990 | Eskra et al. . |
| 4,948,681 | 8/1990 | Zagrodnik et al. ...................... 429/34 |
| 5,004,655 | 4/1991 | Symanski . |
| 5,326,656 | 7/1994 | Meadows et al. ..................... 429/178 |

*Primary Examiner*—Prince Willis, Jr.
*Assistant Examiner*—M. Nuzzolillo
*Attorney, Agent, or Firm*—Harness, Dickey & Pierce

[57] ABSTRACT

An injection molded containment for bipolar batteries of the type which include terminal electrodes and one or more bipolar battery cells is disclosed. In the most preferred embodiment of the present invention, a novel spacer is employed, including beveled edges to facilitate sealing of the injection molding material and the individual cells. Furthermore, the preferred spacer includes a crush ridge to assist in sealing. The present invention facilitates assembly of bipolar batteries in a way which improves sealing when compared to other techniques, such as vibration welding.

20 Claims, 3 Drawing Sheets

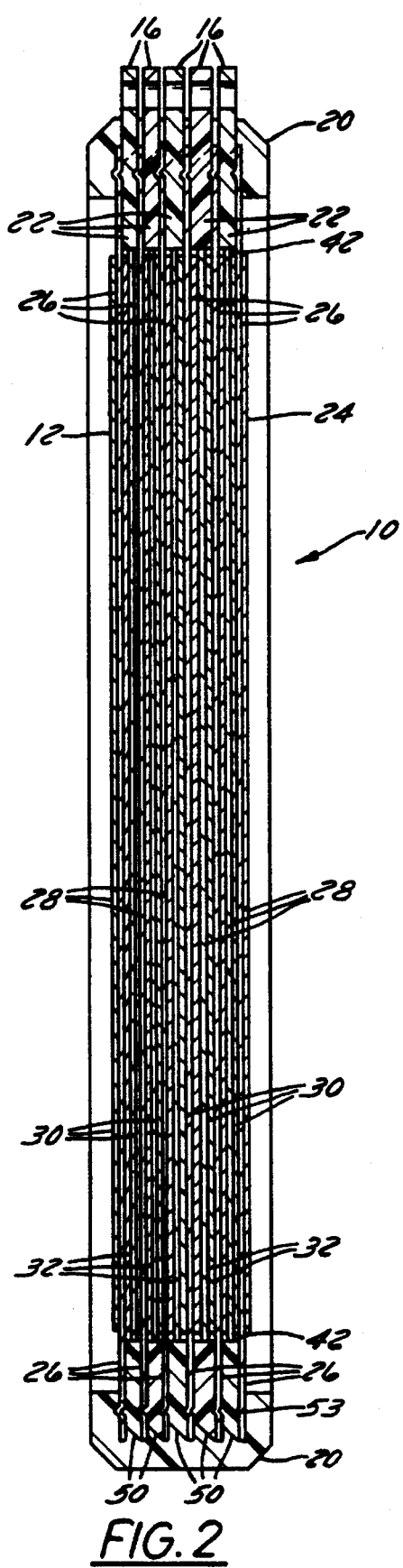
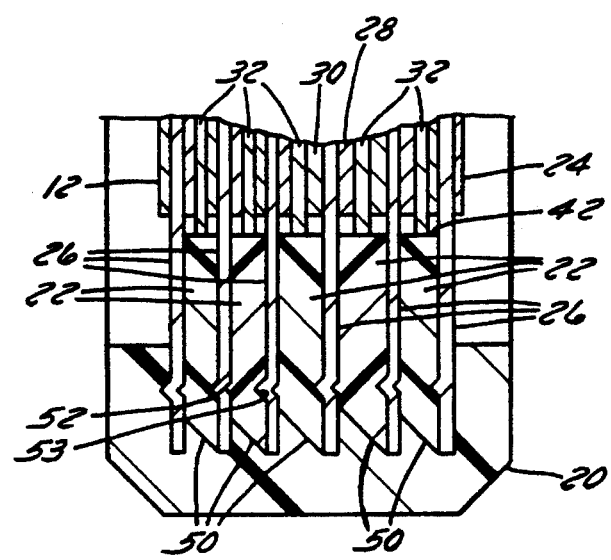
FIG. 2
FIG. 2A

INJECTION MOLDED BATTERY CONTAINMENT FOR BIPOLAR BATTERIES

BACKGROUND OF THE INVENTION

1. Field of the Invention

The present invention relates generally to batteries and in the preferred embodiment to batteries of the bipolar type. Still more particularly, the present invention relates to containment systems for such batteries. In its most preferred embodiment, the present invention relates to a monolithic system for containing a plurality of battery components, including terminal electrodes and one or more battery cells. In its most preferred embodiment, the present invention relates to an injection molded monolithic containment system and a novel spacer.

2. Description of the Prior Art

A number of different systems have been proposed for containing battery components of both the monopolar and bipolar types, all as described in several of the patents which will be discussed in greater detail hereafter. Especially in the area of bipolar batteries, the tendency has been to create individual battery cells and to weld them together, such as by using friction or vibration welding. See, for example, U.S. Pat. No. 4,948,681 issued Aug. 14, 1990 to Zagrodnik, et al. and entitled "Terminal Electrode." In this patent, a plurality of zinc bromine cells are joined with terminal electrodes having a specific structure shown in particular in FIGS. 1 and 6–8. The individual cells and the terminal electrodes are vibration welded to one another to prevent leakage of the battery liquids. In this patent, the terminal electrodes include an injection molded frame, but there is no teaching or suggestion of using the injection molding technique to contain anything more than a single element of the battery.

Basic bipolar battery technology is described in U.S. Pat. No. 4,900,643 issued Feb. 13, 1990 to Eskra, et al. and entitled "Lead Acid Bipolar Battery Plate and Method of Making the Same." In this patent, a plastic conductive material, with a mesh of metallic wire disposed therein, is used as the substrate for the bipolar materials, the active paste material being disposed on either side thereof. In particular, the patent relates to the division of the substrate into discrete areas.

A further patent describing bipolar batteries was issued on Apr. 2, 1991 to Symanski, i.e. U.S. Pat. No. 5,004,655 entitled "Thin Bipolar Lead-Acid Battery With Individual Cell Vent." The invention of this patent relates to the containment of a bipolar battery cell in a spacer which is then covered by film sheets which extend beyond the periphery of the spacer. The spacer resembles a frame for the battery components. The film is sealed, e.g. by heat, in all areas except for a vent hole where a seal of the "duck bill" type may be provided. The patent does not relate in any manner to the use of a monolithic injection molded container for a plurality of individual battery cells.

One problem encountered in the commercialization of the bipolar battery technology has been electrolyte leakage, either from individual cells or from combined cells. In addition, the containment systems used in prior bipolar technology have not provided satisfactory support of the internal components such as separators, electrodes, spacers and substrates, resulting in plate distortion and separator damage. A system which would overcome the problems of electrolyte leakage and proper support for the bipolar battery components would represent a significant advance in the art.

SUMMARY OF THE INVENTION

The present invention features a monolithic battery containment system which, rather than relying on combining individual cells, relies on injection molding to contain a plurality of battery elements.

The present invention further features a spacer configuration which includes both a crush ridge and beveled edges to improve sealing to adjacent spacers and sealing around the periphery thereof.

The present invention still further features a clamping and sealing technique which prevents damage to the internal components of a bipolar battery during assembly and containment.

The present invention also features a containment system in which the compression level applied to a battery component stack is selected for the amount of separator compression required for the battery to function properly.

The present invention further features an injection molding system in which the outer surfaces of the spacers and the bipolar electrode substrate (if the substrate is a thermoplastic) are fused to one another to result in better bonding and sealing.

How these and other objects of the present invention are accomplished will be described in greater detail in the following description of the most preferred embodiment, taken together with the FIGURES. Generally, however, they are accomplished by using an injection molding system to provide a frame-like containment for a plurality of generally planar battery components. In a most preferred bipolar battery prepared according to the present invention, each spacer contains one set of positive and negative electrodes disposed on separate substrates and a separator therebetween. The spacers, with the associated battery components, are stacked in the desired number and terminal electrodes are applied thereto. The stack is then placed into an injection mold which clamps the stack to compress it to a thickness determined by the thickness of the spacers and other components. The compression is maintained by a plastic containment formed around and over the periphery of the stack. When the plastic is injected, it melts the outside edge of the spacers and the bipolar electrode substrates (if the substrates are thermoplastic). After molding is completed, separate steps are performed to produce filling/venting ports in the battery container such as by drilling, milling, insertion of a hot tool, etc. In the most preferred form of the invention, the adjacent components of the electrodes, terminal electrodes and spacers are treated with a compound which assists in preventing acid leakage. Furthermore, in the preferred embodiment, a unique spacer is employed which includes beveled edges to assist in the fusion mentioned above and which also include a crush ridge to assist in the bonding of one spacer to another or to a terminal electrode.

Other ways in which the features of the present invention are accomplished will be described in the following detailed description and such further ways are deemed to fall within the scope of the present invention if they fall within the scope of the claims which follow.

DESCRIPTION OF THE DRAWINGS

In the various drawings described below, like reference numerals are used to indicate like components.

FIG. 2 is a cross section taken along the line 2—2 of FIG. 1 and showing the interior battery components for a five cell battery and also showing the terminal electrodes;

FIG. 2A is an enlarged cross-section taken along the line 2A—2A of FIG. 1;

DETAILED DESCRIPTION OF THE PREFERRED EMBODIMENT

Before proceeding to the detailed description of the most preferred embodiment of the present invention, several comments should be made about the applicability and scope of this invention. First, the materials specified later in this specification are exemplary, and other materials having properties suitable for use in the harsh environment of lead-acid batteries could be readily substituted therefor. Second, the size and shape of the components can vary widely, depending on the power requirements for the battery and space requirements. In this regard, the number and cross sectional area of the various cells and cell components can vary, for example, from 2" by 4" to more than 18" on a side or larger.

Third, the particular spacer shown in the present invention is preferred, but standard spacers which are generally rectangular in perimeter cross section may be used. Also, the crush ridge (to be described later) could be eliminated without departing from the intended scope of the invention. As will be explained more fully, the ridge assists in sealing of the plastic surfaces to one another, while the bevel around the spacer periphery assists in the fusion process to provide a tight seal to prevent movement of internal components and leakage of electrolyte.

Fourth, a sealing aid is described later in the specification, again for use in the most preferred embodiment of the invention. Other materials can be used to assist in the sealing of one component to another, and those skilled in the art would readily appreciate which sealing agents could be substituted for the disclosed types.

Finally, it should be indicated that the particular type of molding equipment used for injection molding the containment frame around the battery elements is a matter of design choice and one skilled in the art could readily select appropriate equipment. What is important is that the assembled elements to be described later are compressed to the degree necessary for proper battery performance and held in this compressed condition while the molding operation takes place.

Figure 1:
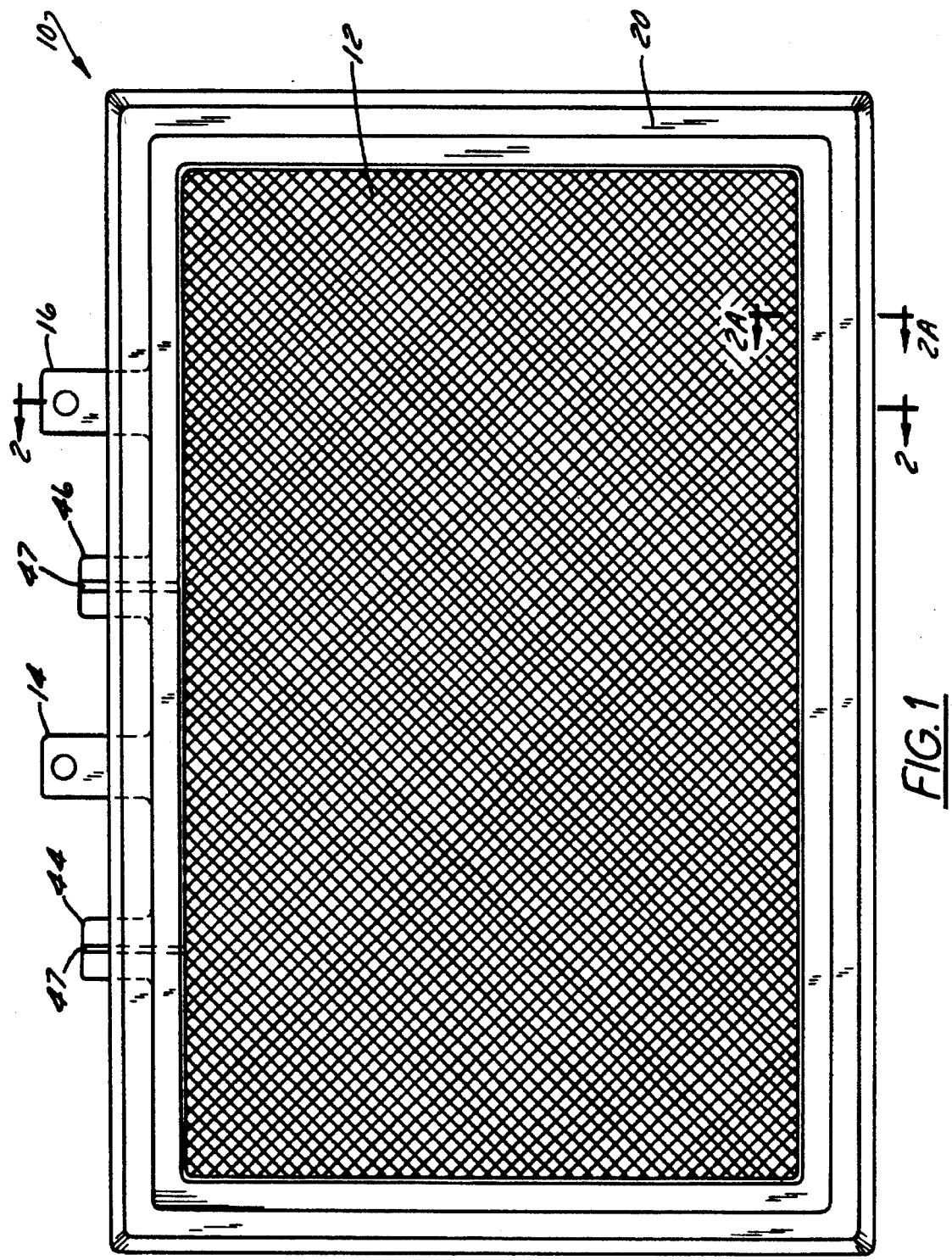
FIG. 1 is a front elevation view of a bipolar battery including the monolithic frame-like container of the present invention.

Proceeding now to FIG. 1, a battery 10 according to the most preferred embodiment of the present invention includes a first terminal electrode 12 (which, in this example, will be the negative terminal electrode), a pair of spacer tabs 14 and 16 extending from the top of the battery, and a frame-like containment 20 surrounding the entire battery but leaving the face of the terminal electrode 12 (and the face of the positive terminal electrode (not shown), exposed. An area 18 located interiorly of the containment 20 is shown on FIG. 1 and is a mold clamp area, i.e. the area in which the clamps (not shown) are applied during compression of the battery components while injection of the molding material used to form containment 20 takes place.

The internal components of battery 10 can better be appreciated by examination of FIG. 2, which shows a five cell battery formed of five spacers 22, the negative terminal electrode 12 and a positive terminal electrode 24. The spacers 22 are each sized to abut a bipolar battery substrate 26 and surround a positive electrode 28 applied to one side thereof and a negative electrode 30 applied to the other side thereof. The spacers are also sized to contain a separator sheet 32 located between electrodes 28 and 30, the latter being under compression during molding.

The individual components used in the formation of the bipolar battery are not described in greater detail here because, in and of themselves, they are well known and do not form part of the present invention. Also not illustrated in this FIG. 2 are the fill holes which are provided in additional spacer tabs described in FIG. 3, it being appreciated that fill holes and vents are necessary in batteries of this type. It will also be apparent to those skilled in the battery art that by employing five spacers, each containing and abutting the elements described above, a five cell battery will result when the positive and negative terminal electrodes (12 and 24) are included. If each electrode cell is designed for 2 V output, the five cell battery 10 will be a 10 V system.

Figure 3:
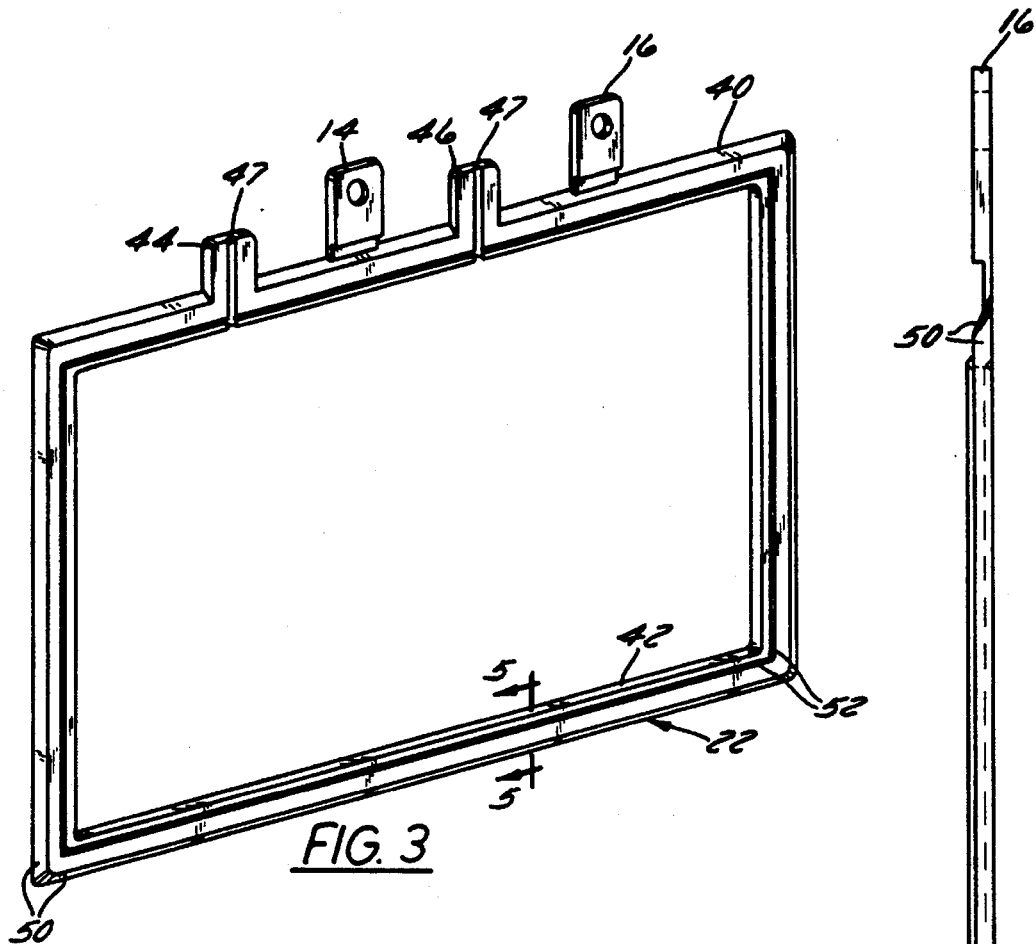
FIG. 3 is a front perspective view of the spacer used in the battery shown in FIGS. 1 and 2.
Figure 4:
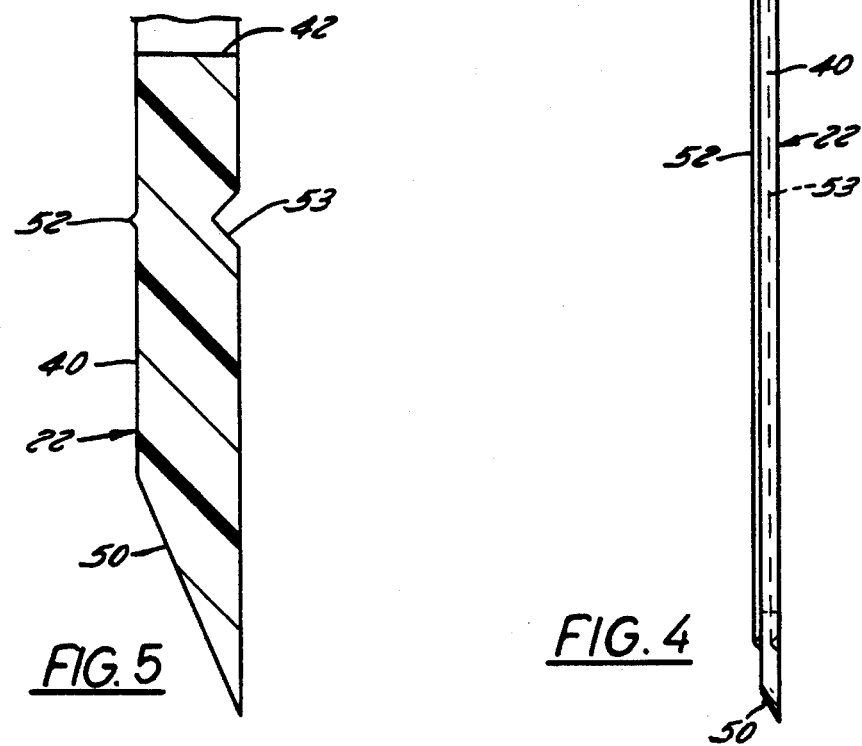
FIG. 4 is an enlarged end view of the spacer shown in FIG. 3.

In connection with FIG. 3, one of the spacers 22 is shown in greater detail to include a generally rectangular frame 40 having a generally rectangular opening 42 therein to receive the electrodes and separators previously identified. Two additional tabs are shown at 44 and 46, each including an elongate channel 47 extending from the tip of the tab to the interior opening 42. These channels, when combined with other spacers, will form channels useful for venting and filling, as previously discussed. Another feature of the spacer 22 which is best shown in FIG. 4 is a beveled edge 50. Edge 50 assists in the overall sealing of the battery to be described later. The particular angle of the bend is not critical, however.

Figure 5:
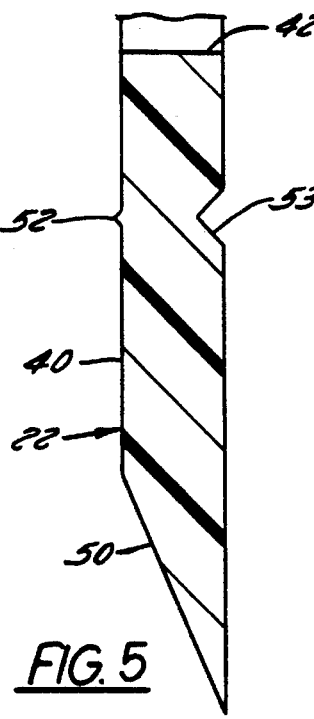
FIG. 5 is an enlarged end view of a portion of the spacer and illustrating the crush ridge taken along the line 5—5 of FIG. 3.

The final feature of spacer 22 is a crush ridge 52, shown best in FIG. 5. A recess 53 is provided on the opposite side of the spacer. The crush ridge 52 has been found to increase the sealing efficiency as spacers are compressed against an adjacent component, i.e. a substrate, prior to the application of molding material. The height of ridge 52 is preferably equal to the difference between the substrate thickness and the depth of the recess 53. For example, for a spacer which is 0.080 inches and where the substrate is 0.020 inches, recess 53 is preferably 0.026 inches deep to cause the ridge 33 to be 0.006 inches in height. The ridge 52 will therefor push the substrate into recess 53 as compression takes place.

With regard to materials, the spacer 22 of one of our most preferred embodiment is made from glass filled high density polyethylene, but other thermoplastic materials useful in bipolar battery components of the prior art could be substituted therefor. These include such materials as low density polyethylene, polypropylene and the like. A particularly suitable material is a thermoplastic rubber, Santoprene®, sold by Monsanto Chemical. Use of this material may eliminate the need for either sealing aids or the crush ridge, since the rubber properties allow desirable bonding to adjacent components, acting like a gasket.

With respect to the sealing aid mentioned previously, we have found that the application of an acid resistant rosin or rubber compound, such as chlorosulfanated polyethylene (CSM) also assists in improving sealing. Two suitable CSM materials are Hypalon® manufactured by Minor Rubber Company, and the CSM distributed by E. I. du Pont. The sealing aid is typically dissolved in a solvent, such as 1,1,1-trichloroethane.

Now that the major components of the battery of the present invention have been described, the containment itself can be further discussed. The materials used for the injection molded containment 20 are preferably thermoplastic resins such as high density polyethylene, ABS, polypropylene and polyethylene (low density or high density). Generally, any resin which is thermoplastic and which can withstand the acid environment of lead-acid batteries can be employed. Resistance to temperatures between about −50° F. and 170° F. is also highly desirable.

The heated molding material is injected around the periphery of the spacers and terminal electrodes to contain all of the components described above. The injection molded material is liquid and will flow around the battery exterior to form containment 20. It is most desirable that the temperature be suitable to fuse at least some of the containment material to the beveled edges 50 of the spacers 22 and also the substrates 26, if they include thermoplastic components. Such fusion results in better leak prevention and in assuring that the internal electrode components are properly supported and will not move during use. During the molding process, the area between spacers 22 in the vicinity of beveled edges 50 will receive molten thermoplastic molding material, causing the fusion to occur and ensuring efficient bonding.

While the present invention has been described in connection with certain preferred embodiments, it is not to be limited thereby but is to be limited solely by the scope of the claims which follow. For example, while a wood rosin could be used instead of the CSM materials as a sealing aid, various urethanes and silicones could also be used. Furthermore, holes could be provided in the substrates and spacers to align the various components prior to the compression operations. The terminal electrodes themselves would normally include taps or studs for connecting the battery to a desired output, and the materials used for the terminal electrodes could be either alloys or highly conductive carbon/resin composites used in newer bipolar systems.

Accordingly, what we claim is as follows:

1. A battery comprising: a pair of generally planar terminal electrodes, each terminal electrode having a peripheral edge;

at least one bipolar battery cell located intermediate the terminal electrodes, the at least one battery cell having a peripheral edge; and a monolithic injection molded thermoplastic resin containment frame adhering to and surrounding each peripheral edge but leaving portions of the terminal electrodes exposed.

2. The battery of claim 1, wherein each bipolar battery cell includes a thermoplastic resin spacer surrounding positive and negative electrodes and a separator located between the electrodes.

3. The battery of claim 2, wherein each spacer includes a beveled edge on at least a portion of its peripheral edge.

4. The battery of claim 2, wherein each spacer includes an outer peripheral edge, an inner edge defining an opening to receive the electrodes and separator, and a crush ridge intermediate the peripheral edge and the inner edge.

5. The battery of claim 2, wherein the containment frame is at least partially fused with the peripheral edge of each spacer.

6. The battery of claim 2, further comprising a sealing aid located between adjoining surfaces of thermoplastic battery components.

7. The battery of claim 6, wherein the sealing aid comprises chlorosulfonated polyethylene.

8. The battery of claim 1, wherein the containment frame comprises high density polyethylene.

9. The battery of claim 1, wherein the terminal electrodes and intermediate cells are under compression.

10. The battery of claim 1, further comprising fill and vent openings extending through the containment frame and into each cell.

11. The battery of claim 2, wherein the spacer comprises thermoplastic rubber.

12. A method of making a bipolar battery of the type which includes generally planar and spaced apart terminal electrodes and bipolar battery cells disposed therebetween, comprising the steps of:

stacking the terminal electrodes and cells;

applying a compressive force to the terminal electrodes; and injection molding a thermoplastic resin containment frame around the periphery of the compressed stack leaving exposed a portion of the terminal electrodes.

13. The method of claim 12, wherein each bipolar battery cell includes a thermoplastic resin spacer adjacent to a conductive substrate and surrounding positive and negative active electrodes and a separator, and the molding step further including joining the containment frame to each spacer.

14. The method of claim 13, wherein the spacer is at least partially fused to the containment frame.

15. The method of claim 13, wherein the spacer includes a peripheral edge that is thinner than the body of the spacer.

16. The method of claim 13, wherein each spacer includes a crush ridge and wherein the crush ridge is deformed during the compression step.

17. The method of claim 13, comprising the further step of applying a sealing aid between components prior to the compression step.

18. The method of claim 17, wherein the sealing aid comprises chlorosulfonated polyethylene.

19. The method of claim 12, including the further step of providing fill and vent openings for the battery cells after the injection molding step.

20. The method of claim 13 wherein the thermoplastic spacer comprises thermoplastic rubber.

* * * * *